US009389637B2

(12) United States Patent
Nguyen et al.

(10) Patent No.: US 9,389,637 B2
(45) Date of Patent: Jul. 12, 2016

(54) METHODS AND SYSTEMS FOR RECOVERING INTERMITTENT TIMING-REFERENCE SIGNALS

(71) Applicant: Rambus Inc., Sunnyvale, CA (US)

(72) Inventors: Huy Nguyen, San Jose, CA (US); Vijay Gadde, Cupertino, CA (US); Kambiz Kaviani, Palo Alto, CA (US); Thomas Giovannini, San Jose, CA (US); Todd Bystrom, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 374 days.

(21) Appl. No.: 13/867,954

(22) Filed: Apr. 22, 2013

(65) Prior Publication Data

US 2013/0290766 A1 Oct. 31, 2013

Related U.S. Application Data

(60) Provisional application No. 61/638,061, filed on Apr. 25, 2012.

(51) Int. Cl.
*G06F 1/12* (2006.01)

(52) U.S. Cl.
CPC ........................................ *G06F 1/12* (2013.01)

(58) Field of Classification Search
CPC ... G06F 13/4243; G06F 1/12; G11C 11/4076; G11C 2207/2254; G11C 29/022; G11C 29/023; G11C 29/028; G11C 7/04; G11C 7/1078; G11C 7/1093; G11C 7/22; G11C 7/222; H04L 7/0008
USPC .......................................................... 713/400
See application file for complete search history.

(56) References Cited

U.S. PATENT DOCUMENTS

| | | | | |
|---|---|---|---|---|
| 5,892,609 | A * | 4/1999 | Saruwatari | 398/202 |
| 7,489,153 | B2 * | 2/2009 | Spirkl | 324/750.3 |
| 7,859,299 | B1 * | 12/2010 | Gay | G11C 7/10 326/30 |
| 2003/0200407 | A1* | 10/2003 | Osaka et al. | 711/167 |
| 2009/0059642 | A1* | 3/2009 | Ware et al. | 365/63 |
| 2009/0080266 | A1 | 3/2009 | Zumkehr | |
| 2011/0063931 | A1* | 3/2011 | Linam et al. | 365/193 |
| 2011/0199843 | A1* | 8/2011 | Dreps et al. | 365/193 |
| 2012/0039136 | A1* | 2/2012 | Linam | 365/189.18 |
| 2013/0010546 | A1* | 1/2013 | Wang et al. | 365/189.07 |

OTHER PUBLICATIONS

Micron Technology, Inc., Technical Note, "General DDR SDRAM Functionality", General DDR SDRAM Functionality, TN-46-05, Rev. A. Published Jul. 2001. 11 Pages.

* cited by examiner

*Primary Examiner* — Chun Cao
*Assistant Examiner* — Chad Erdman
(74) *Attorney, Agent, or Firm* — Silicon Edge Law Group LLP; Arthur J. Behiel

(57) ABSTRACT

A source-synchronous communication system in which a first integrated circuit (IC) conveys a data signal and concomitant strobe signal to a second IC. One or both ICs support hysteresis for the strobe channel that allows the second IC to distinguish between strobe preambles and noise, and thus prevent the false triggering of data capture. Hysteresis may also be employed to quickly settle the strobe channel to an inactive level after receipt of a strobe postamble.

32 Claims, 7 Drawing Sheets

METHODS AND SYSTEMS FOR RECOVERING INTERMITTENT TIMING-REFERENCE SIGNALS

BACKGROUND

Integrated circuits often communicate data signals "synchronously," which means that the communicating circuits time the transmission and receipt of the data to a common reference. In source-synchronous systems the timing reference is sourced by the same circuit that transmits the data. Being from the same source, the data and timing-reference signals are developed by the same circuit and traverse similar communication channels, and consequently experience similar phase distortion due to, e.g., transmission delays, supply-voltage noise, and temperature fluctuations. Distortion that tends to advance or retard the phase of the data signals will likewise advance or retard the phase of the associated timing reference, for example, so the similar phase errors cancel at the receiver.

Double Data Rate (DDR) memory interfaces exemplify high performance, source-synchronous channels. DDR devices convey data signals with a concomitant strobe signal. The strobe signal is like a clock signal that is turned off when there is no data to sample. In the case of DDR devices, a strobe signal from a memory device is activated when data is read from the device, and that strobe is used by a receiving memory controller to recover the data. For memory writes, the memory controller asserts a strobe signal concomitant with the data to be written. The data strobe timing pattern includes a preamble that precedes the data and allows for the receiving device to enable the circuitry necessary to capture the imminent data, a toggling portion that includes signal transitions for timing receipt of the data, and a postamble that returns the strobe line to a stable, low-power state.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
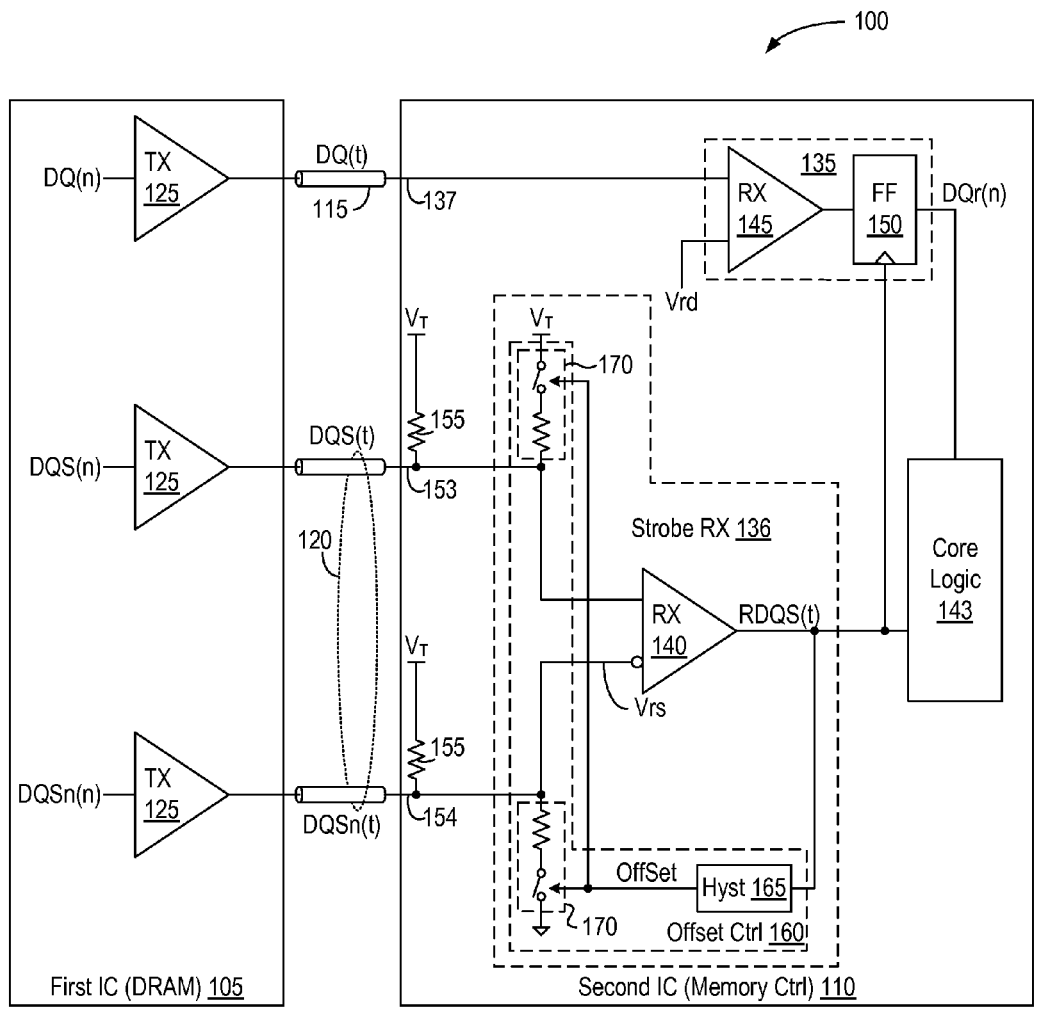
FIG. 1 depicts a source-synchronous communication system 100 in which a first IC 105 conveys a data signal DQ(t) and concomitant strobe signal DQS(t)/DQSn(t) to a second IC 110 via respective single-ended and differential channels 115 and 120.

FIG. 1 depicts a source-synchronous communication system 100 in which a first IC 105 conveys a data signal DQ(t) and concomitant strobe signal DQS(t)/DQSn(t) to a second IC 110 via respective single-ended and differential channels 115 and 120. IC 110 supports hysteresis for the strobe channel 120 that allows IC 110 to distinguish between strobe preambles and noise on channel 120, and thus prevents the false triggering of data capture. ICs 105 and 110 are, e.g., a dynamic, random-access memory (DRAM) and an associated memory controller. In such embodiments channel 115 is typically one of a number of single-ended data channels, eight being common. The data channels can be differential in other embodiments.

IC 105 includes three communication circuits 125, all transmitters, one for each signal line to IC 110. Each strobe transmitter (TX) 125 is coupled to an external node of IC 105 via a terminated connection that includes two termination impedances respectively connected to a termination voltage $V_T$ and ground. The data transmitter can be likewise terminated, for example to support communication from IC 110 to IC 105 in a bidirectional embodiment.

IC 110 includes two communication circuits, a sampler 135 and a differential strobe receiver 136. Sampler 135, represented as a comparator 145 and a flip-flop 150, is coupled to channel 115 via an external data node 137 that receives data signal DQ(t) as sequences of data symbols (e.g., sequences of alternative voltage levels representing different logic values) separated by idle periods. Comparator 145 measures each incoming symbol with respect to a reference voltage Vrd, and drives its output high or low depending on the relative values. The results of each comparison are then captured on an edge of a recovered timing-reference signal RDQS(t) from strobe receiver 136 and passed to some core logic 143 as recovered data DQr(n). Core logic can be any of myriad circuit resources, and includes control logic in the example in which IC 110 is a memory controller. Core logic 143 can be in the same time domain as sampler 135, in which case it can be timed to the same recovered timing reference signal RDQS (t). If in a different time domain, core logic 143 can be provided with a locally developed or external clock signal.

Reference voltage Vrd can be generated locally, or can be generated from a signal or signals from IC 105 such that it carries the same dynamic noise that distorts the associated data signal or signals. For example, reference voltage Vrd can be the average value of the voltage on one of the conductors extending between ICs 105 and 110. Distortion that impacts the transmitted signals thus similarly impacts reference voltage Vrd, and thus tends to cancel at comparator 145. Such distortion is commonly due to, e.g., cross-coupling of signals from adjacent conductors, power-supply noise, temperature drift, and inter-symbol interference (ISI).

Differential timing-reference nodes 153 and 154 on IC 110 receive respective intermittent timing-reference signals DQS(t) and DQSn(t), and are terminated to local termination voltage $V_T$ via respective termination elements 155. The differential inputs of amplifier 140 are coupled to respective ones of timing-reference nodes 153 and 154 to compare signals DQS(t) and DQSn(t), each of which serves as a reference voltage for the other, to provide recovered timing-reference signal RDQS(t). The timing reference is delivered as a differential signal in this example for improved noise tolerance, and consequently higher speed performance. This superior noise tolerance is due in part to the fact that two signal halves are measured relative to one another so that amplifier 140 can reject noise common to both signals (e.g., the signal on the inverting terminal of amplifier 140, designated with a "bubble," serves as a voltage reference Vrs against which the signal on the non-inverting terminal is compared). The timing-reference signal is conveyed as a single-ended signal in other embodiments, in which case strobe reference voltage Vrs can be generated locally, or can be generated from a signal or signals from IC 105 such that it carries the same dynamic noise that distorts the timing-reference signal. For example, reference voltage Vrs can be the time-averaged value of the voltage on one of the conductors extending between ICs 105 and 110. Distortion that impacts the transmitted signals thus similarly impacts reference voltage Vrs, and thus tends to cancel at amplifier 140.

As noted previously, IC 110 supports hysteresis to distinguish between strobe preambles and noise on channel 120. To this end, strobe receiver 136 exhibits a relatively high sensitivity to the strobe signal on nodes 153 and 154 when the strobe is active, and a relatively lower sensitivity to whatever signals appear on nodes 153 and 154 when the strobe is inactive.

IC 110 includes offset control circuit 160 that offsets the input signal levels of amplifier 140 absent the intermittent timing-reference signal DQS(t)/DQSn(t) to reduce the sensitivity of amplifier 140 to noise. Control circuit 160 includes hysteresis logic 165 that uses feedback from amplifier 140 to control a pair of selectable impedances 170. In this context, "hysteresis" refers to the dependence of the voltage difference across the input nodes of receive amplifier 140 on both the present state and a prior state of differential signal DQS(t)/DQSn(t).

In embodiments in which ICs 105 and 110 are a memory and a memory controller, respectively, core logic 143 can issue IC 105 memory commands CA on a command bus (not shown) instructing IC 105 to, e.g., read or write data. In such cases core logic 143 can disable offset control 160 (open switches 170) to save power while strobe channel 120 is idle. Core logic 143 can then enable the offset with the issuance of a read command in anticipation of the strobe signal that will accompany the requested read data. Core logic 143 can once again disable offset control 160 when the read transaction is complete. In embodiments in which commands are transmitted to the IC that includes the offset control circuitry, the offset can be enabled responsive to, e.g., read commands and disabled when the strobe channel is idle.

Figure 2:
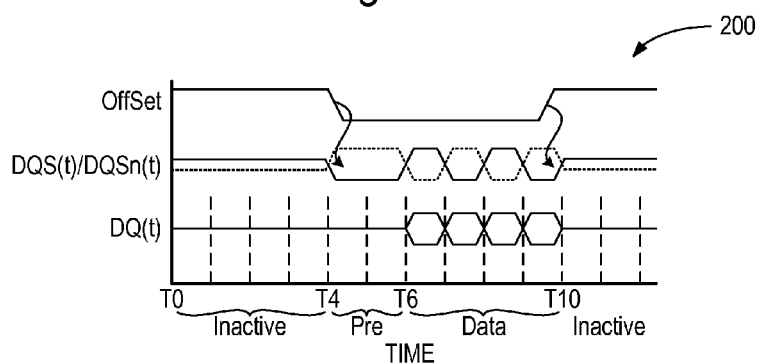
FIG. 2 is a waveform diagram 200 illustrating timing reference and data signals DQS(t)/DQSn(t) and DQ(t) of FIG. 1 in accordance with one embodiment.

FIG. 2 is a waveform diagram 200 illustrating timing reference and data signals DQS(t)/DQSn(t) and DQ(t) of FIG. 1 in accordance with one embodiment. The horizontal axis is divided into bit times, each of which is the duration of one data symbol DQ(t). Strobe signal DQS(t)/DQSn(t) is inactive for the first four bit times, during which time hysteresis logic 165 asserts signal OffSet to enable termination impedances 170, and thus pulls nodes 153 and 154 slightly up and down, respectively. The resultant voltage offset between the input nodes of amplifier 140 drives signal RDQS(t) high. By imposing this separation of input voltages to amplifier 140, offset control circuit 160 prevents amplifier 140 from inadvertently confusing noise on channel 120 with the beginning of a strobe preamble. Preambles are other lengths and patterns in other embodiments.

The voltage offset applied when signal DQS(t)/DQSn(t) is inactive can be calibrated to be some amount greater than the expected noise on channel 120. Preamble signals have greater amplitudes than the expected noise. Amplifier 140 is therefore able to sense a transition representative of a preamble despite the imposed offset. Once sensed, recovered strobe signal RDQS(t) from amplifier 140 transitions low, causing hysteresis logic 165 to disable (place in a high-impedance state) termination impedances 170 to remove the imposed offsets. Channel 120 is thereafter properly terminated by the values of elements 155 to provide improved signaling margins for the acquisition of subsequent edges on signal DQS(t)/DQSn(t). These edges are then used over the next symbol times to sample each data symbol, and thus recover the incoming data. Though not shown, phase adjustment circuitry within one or both ICs may be used to align the strobe edges as needed for sample timing, as is well known to those of skill in the art. Also well known, the values of termination elements 155 can be calibrated with respect to an internal or external reference to improve signal integrity.

Once the data transmission is complete, channel 120 returns to an inactive state, and offset control circuit 160 enables termination impedances 170 to reestablish the voltage offset between the input nodes of amplifier 140. Offset control circuit 160 can detect the absence of the recovered timing-reference signal by sensing the postamble, noting an absence of transitions of signal RDQS(t), or may receive an instruction from core logic 143.

Figure 3:
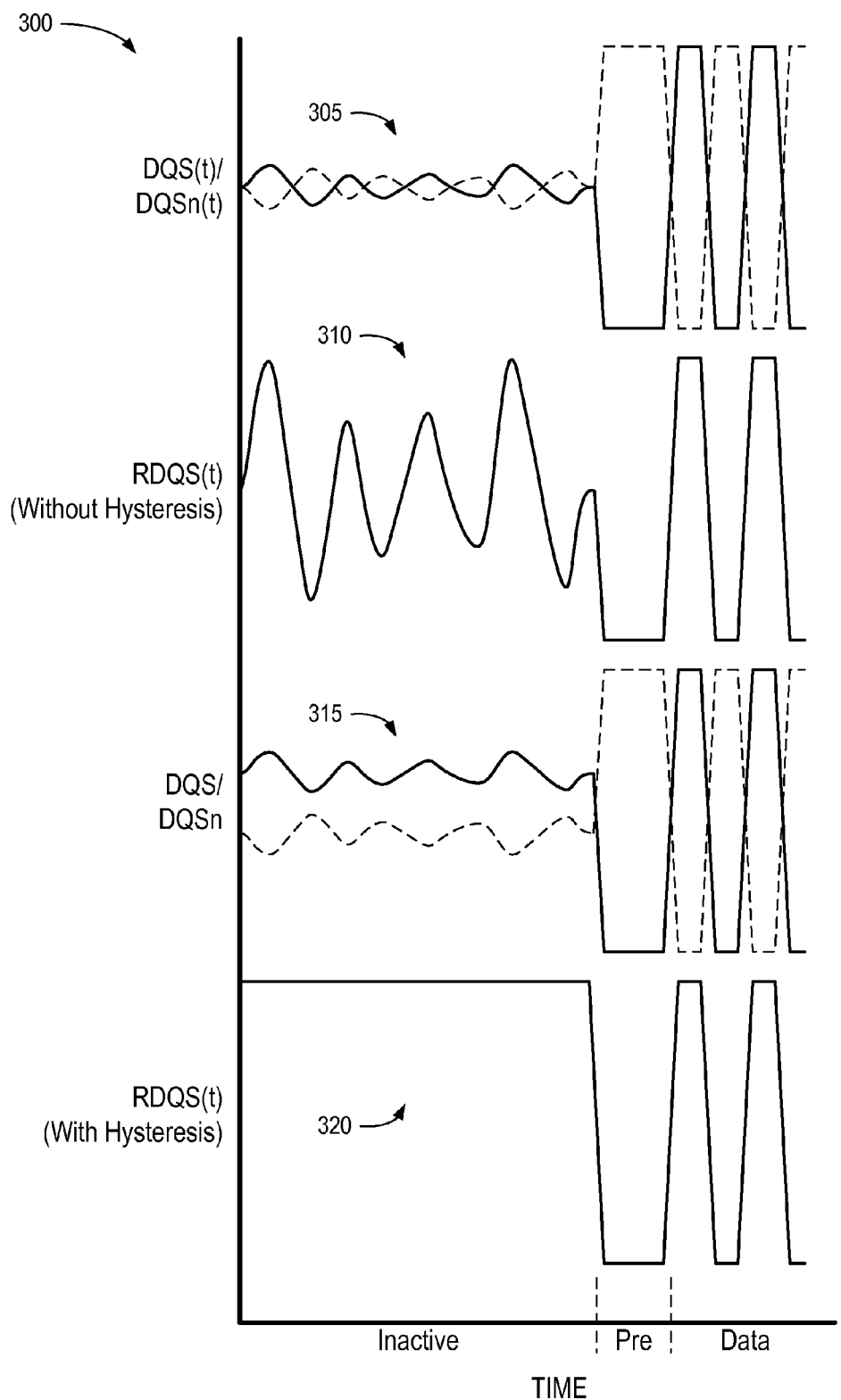
FIG. 3 is a waveform diagram 300 illustrating the problem of sensing a preamble absent hysteresis and the solution provided by the embodiment of FIG. 1.

FIG. 3 is a waveform diagram 300 illustrating the problem of sensing a preamble absent hysteresis and the solution provided by the embodiment of FIG. 1. The uppermost waveform 305 is an exemplary differential timing-reference signal, including a noisy inactive period followed by preamble and data periods Pre and Data as discussed in connection with FIG. 2. With reference to FIG. 1, waveform 305 is input to amplifier 140, the output of which corresponds to a comparison of the differential signal components. Noise that can occur during the inactive period may be amplified, as shown in waveform 310, such that signal RDQS(t) varies despite the absence of a preamble. Such random variations can be interpreted to be the start of a preamble, in which case IC 110 may inadvertently trigger the recovery of errant data.

The next waveform 315 is similar to waveform 305, but an offset is imposed on the differential signals during the inactive period. The offset is calibrated such that noise on channel 120 (FIG. 1) is insufficient to cause the output of amplifier 140 to change state. As a consequence, as shown in the final waveform 320, signal RDQS(t) remains stable during the inactive period.

Data transmissions are followed by a postamble that returns the timing-reference lines to a stable, low-power state. The strobe might be used for subsequent communication in the same or the opposite direction between the same two devices, or between one or more other devices. The strobe lines should be stabilized quickly to accommodate such subsequent use.

Figure 5:
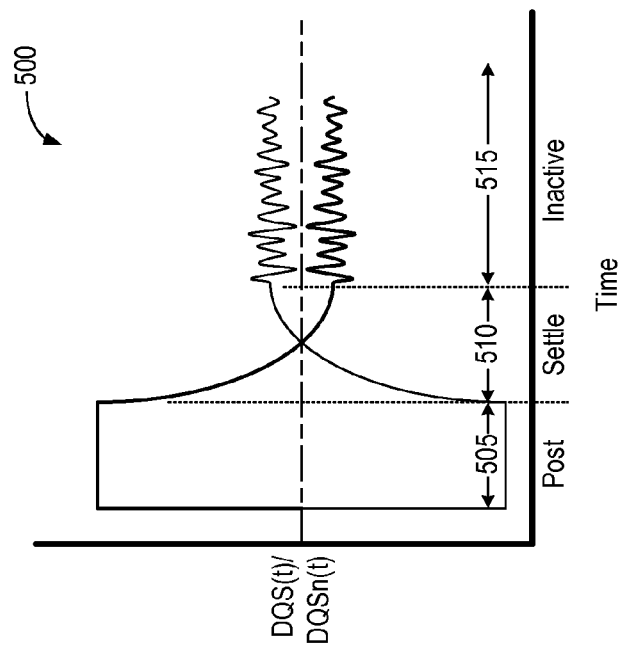
FIG. 5 depicts a waveform diagram 500 that is used in connection with FIG. 4 to illustrate the operation of IC 400.
Figure 4:
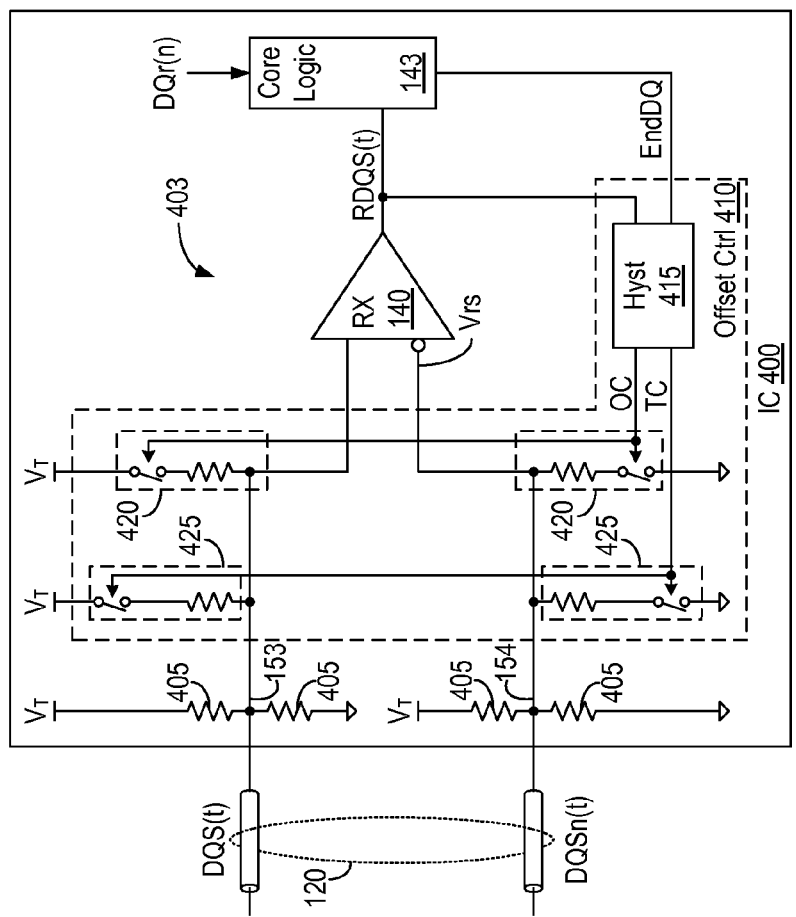
FIG. 4 depicts an IC 400 in accordance with an embodiment that employs hysteresis to distinguish between noise and strobe preambles, and to quickly settle the timing-reference signal lines after receipt of the postamble.

FIG. 4 depicts an IC 400 in accordance with an embodiment that employs hysteresis to distinguish between noise and strobe preambles, as detailed previously, and to quickly settle the timing-reference signal lines after receipt of the postamble. IC 400 resembles IC 110 of FIG. 1, with like-identified elements being the same or similar. FIG. 5 depicts a waveform diagram 500 that is used in connection with FIG. 4 to illustrate the operation of IC 400.

As in the example of FIG. 1, differential timing-reference nodes 153 and 154 receive respective intermittent timing-reference signal halves DQS(t) and DQSn(t), and are terminated to local termination voltage $V_T$ and ground, both DC nodes, via a collection of termination elements 405. The differential inputs of amplifier 140 are coupled to respective ones of timing-reference nodes 153 and 154 to compare signal halves DQS(t) and DQSn(t), each of which serves as a reference voltage for the other, to provide recovered timing-reference signal RDQS(t).

IC 400 supports hysteresis to distinguish between strobe preambles and noise on channel 120. To this end, IC 400 includes a strobe receiver 403 in which an offset control circuit 410 offsets the input signal levels of amplifier 140 absent the intermittent timing-reference signal DQS(t)/DQSn (t) to reduce the sensitivity of amplifier 140 to noise. Control circuit 410 includes hysteresis logic 415 that uses feedback from amplifier 140 to control a pair of selectable impedances 420 in the manner detailed previously in connection with IC 110 of FIG. 1. Briefly, hysteresis logic asserts an offset control signal OC that closes switches in impedances 420 to introduce a voltage offset between the input nodes of amplifier 140 absent a strobe signal, and deasserts signal OC to reduce or eliminate the voltage offset when amplifier 140 detects a preamble transition.

Offset control circuit 410 additionally includes a second pair of selectable impedances 425 that can be enabled to reduce the impedance between supply node $V_T$ and node 153, and between ground and node 154. This enhancement can be employed to expedite imposition of the desired offset between nodes 153 and 154 during inactive periods of the strobe channel. In essence, control circuit 410 steps through a number of impedances—two in this example—to transition to the idle periods. In other embodiments control circuit 410 can change the impedance over different ranges, and such adjustments can be accomplished using different adjustment granularities.

With reference to FIG. 5, the first period 505 represents the end of a postamble of timing reference strobe DQS(t)/DQSn (t). Core logic 143 (FIGS. 1 and 4) asserts signal EndDQ to hysteresis logic 415 when core logic 143 detects an end of a data transmission. Hysteresis logic 415 then asserts offset control signal OC and a transition-control signal TC to enable all four termination impedances 420 and 425 during a settling period 510, and thus quickly imposes the desired offset. Hysteresis logic 415 thereafter disables impedances 425, leaving impedances 420 enabled, to hold the voltage between nodes 153 and 154 at the desired offset while the strobe lines remain inactive (period 515). Sensing of subsequent strobes and the resultant removal of the applied offset is as discussed previously.

Offset control circuit 410 is illustrated as separate from the termination elements for ease of illustration. In other embodiments adjustable termination elements can support both on-die termination calibration and offset control. For example, a single adjustable impedance can be used to implement the pull-up termination impedance 405 on node 153 and both selectable impedances 420 and 425. That one adjustable impedance could then be calibrated and controlled to provide a desired impedance between node 153 and DC node $V_T$ for each of periods 505, 510, and 515 of FIG. 5. The same adjustable impedance can also support a high-impedance state in which node 153 is effectively decoupled from one or both DC nodes. A single adjustable impedance can likewise serve as the pull-down impedances for node 154.

Figure 6:
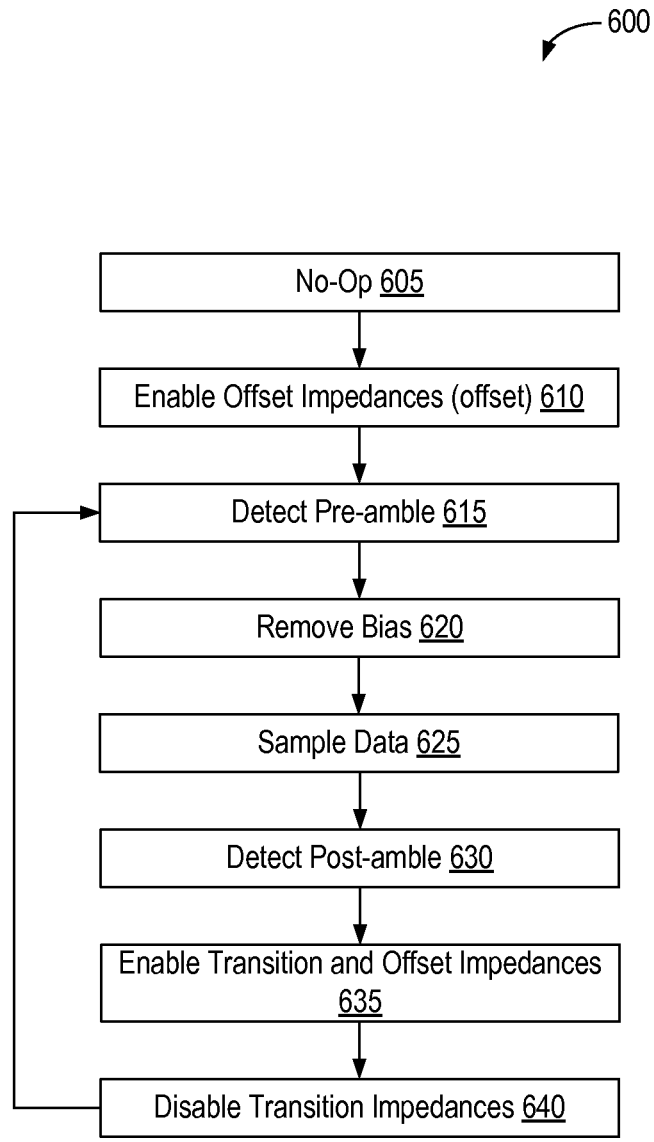
FIG. 6 is a flowchart 600 outlining the operation of IC 400 of FIG. 4 in accordance with one embodiment.

FIG. 6 is a flowchart 600 outlining the operation of IC 400 of FIG. 4 in accordance with one embodiment. The first step 605, entitled "no-op," occurs when core logic 143 identifies a quiescent period in which no data is being transmitted. This can occur, e.g., at start up, or following receipt of a postamble. Strobe signal DQS(t)/DQSn(t) is inactive during this time, and core logic 143 enables termination impedances 420 to enable a termination bias, and consequently imposes a voltage offset between nodes 153 and 154 (610). The offset remains until amplifier 140 detects a signal transition indicative of a preamble (615), and consequently drives recovered strobe signal RDQS(t) low. Hysteresis logic 415 responds by disabling impedances 420 to remove the applied voltage offset between nodes 153 and 154 (620). Thereafter transitions of recovered strobe signal RDQS(t) are used to sampling incoming data (625). Phase adjustment circuitry, not shown, may be used to align the strobe edges as needed for sample timing, as is well known to those of skill in the art.

The incoming data symbols will eventually end, and will be followed by a postamble on the strobe channel. Core logic 143 detects postamble (630), and will instruct hysteresis logic 415 to enable both the transition impedances 425 and the offset impedances 420 to induce the signal halves of differential signal DQS(t)/DQSn(t) to rapidly approach the desired voltage offset (635), as illustrated during time period 510 in FIG. 5. Finally, hysteresis logic 415 disables transition impedances 425 (640), leaving offset impedances 420 enabled to impose the desired voltage offset while the strobe signal is inactive. IC 400 then awaits the next preamble.

Figure 7:
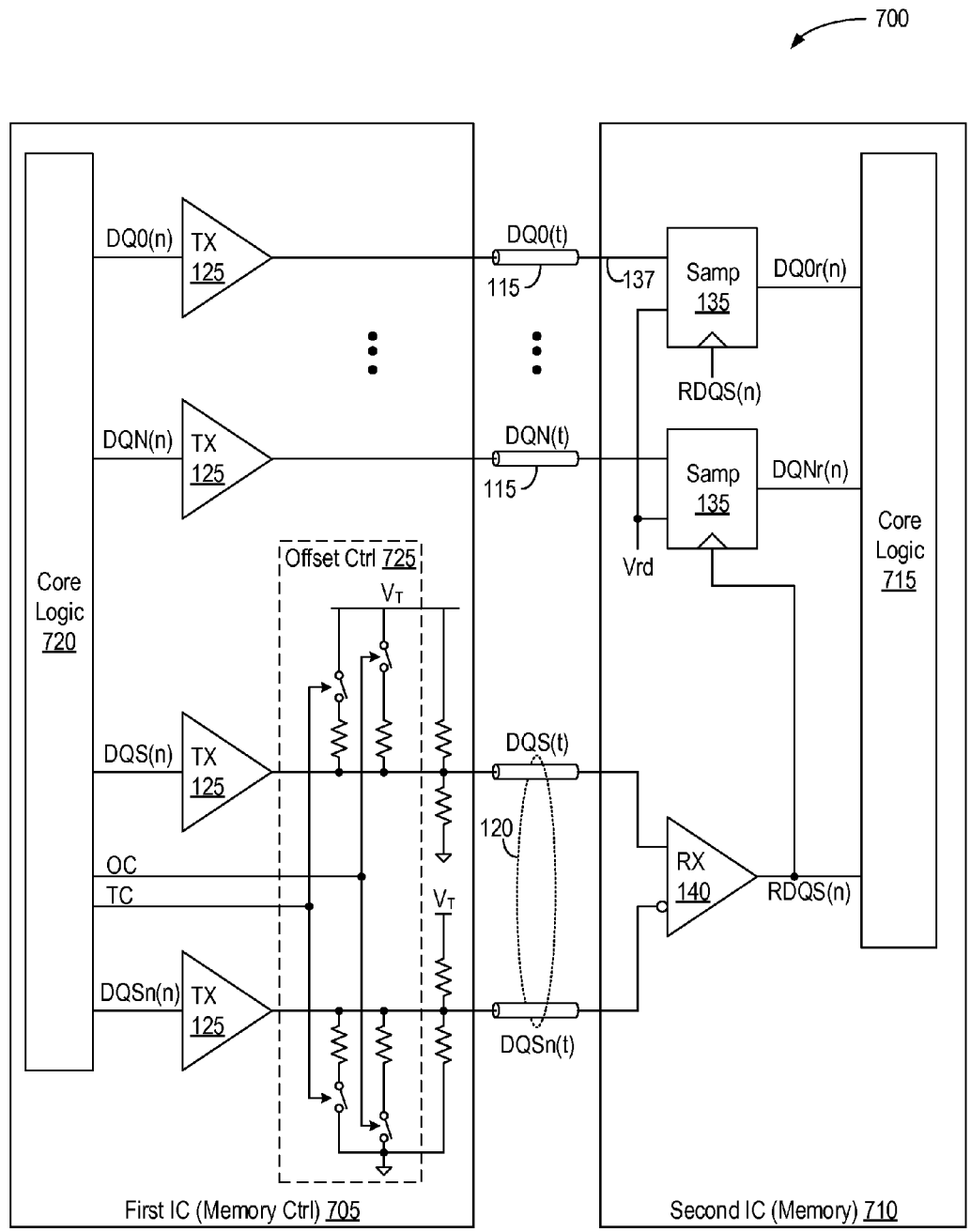
FIG. 7 depicts a source-synchronous communication system 700 that manages imposition of voltage offsets from the transmit side of a strobe channel.

FIG. 7 depicts a source-synchronous communication system 700 that manages imposition of voltage offsets from the transmit side of a strobe channel, rather than from the receive side as in the prior examples. System 700 resembles system 100 of FIG. 1, with like-identified elements being the same or similar. In this example the transmitting IC 705 is a memory controller and the receiving IC 710 a memory device. A given IC, such as a memory controller, can manage the imposition of voltage offsets for both transmit and receive signals, thus reducing the complexity of the other IC or ICs. In a memory system with multiple memory devices, for example, all the offset management can be handled at the memory controller so that the memory devices can omit this complexity (e.g., IC 710 can be a memory device that lacks an offset control circuit, and includes core logic 715 without support for such control).

IC 705 includes core logic 720 that supports conventional memory-controller functionality, and is modified to issue an offset control signal OC and transition control signal TC to transmit-side offset control circuit 725. The offset and transition control is performed as described in connection with FIGS. 4-6 except that core logic 720 is aware of the strobe timing, and therefore does not require hysteresis logic and related circuitry to detect the various intervals of strobe signal DQS(t)/DQSn(t). Instead, core logic 720 simply asserts signals OC and TC as needed to manage offsets and transitions.

Figure 8:
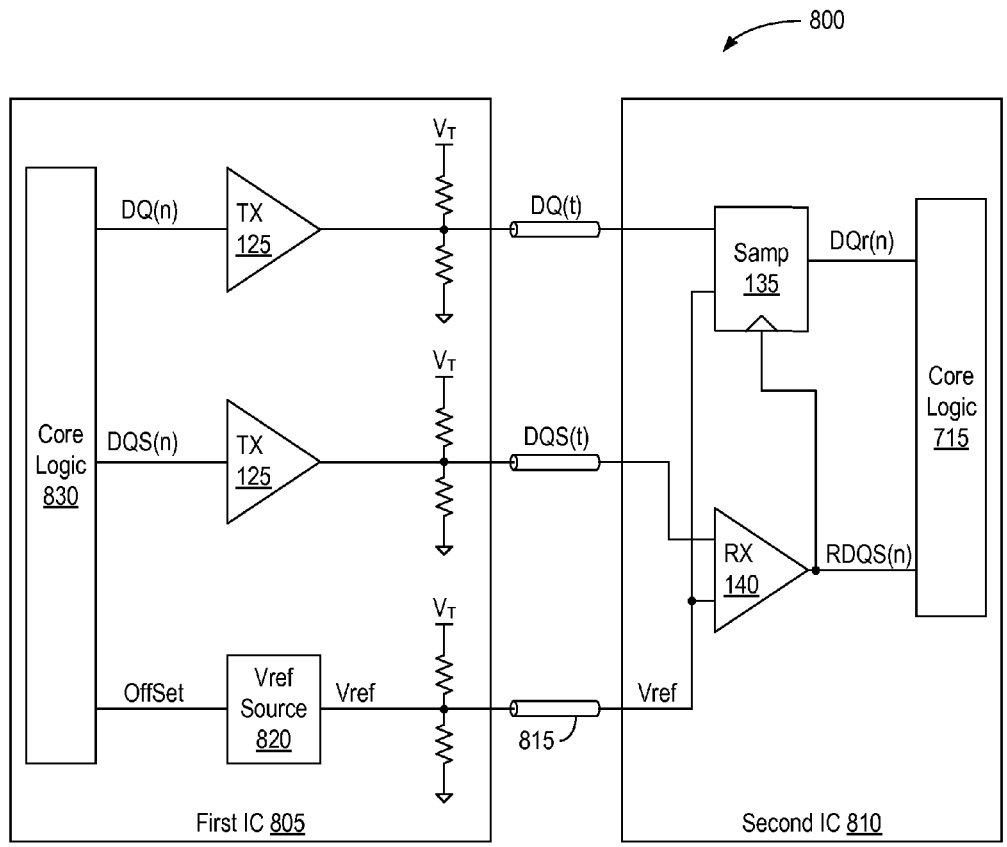
FIG. 8 depicts a communication system 800 in accordance with an embodiment in which a timing-reference signal DQS(t) is conveyed between a first IC 805 and a second IC 810 as a single-ended signal.
Figure 9:
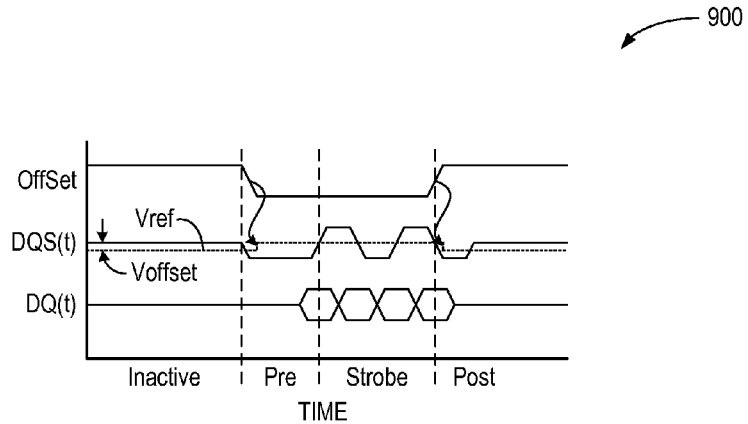
FIG. 9 depicts a waveform diagram 900 that is used in connection with FIG. 8 to illustrate the operation of system 800.

FIG. 8 depicts a communication system 800 in accordance with an embodiment in which a timing-reference signal DQS (t) is conveyed between a first IC 805 and a second IC 810 as a single-ended signal. The single-ended signal DQS(t) is compared against a reference voltage Vref conveyed from IC 805 to IC 810 on a dedicated reference channel 815. ICs 805 and 810 can be, e.g., a memory controller and a memory device. System 800 resembles embodiments illustrated in connection with previous figures, with like-identified elements being the same or similar. FIG. 9 depicts a waveform diagram 900 that is used in connection with FIG. 8 to illustrate the operation of system 800.

IC 805 includes a local reference voltage source 820 that provides and calibrates reference voltage Vref on a like-identified reference voltage node. Core logic 830, familiar with the timing of data and strobe signals DQ(n) and DQS(n), manipulates a control signal OffSet to impose a voltage offset on voltage Vref while strobe signal DQS(t) is inactive. This offset translates into a corresponding voltage offset across the input nodes of receive amplifier 140 on IC 810 that renders amplifier 140 insensitive to noise on the inactive strobe channel.

With reference to FIG. 9, core logic 830 asserts signal OffSet while signal DQS(t) is inactive to impose a voltage Voffset between the inactive strobe voltage and voltage Vref. Voltage Voffset is sensed across the input nodes of amplifier 140 to hold signal RDQS(t) high. Core logic 830 deasserts signal OffSet, thereby setting voltage Voffset to zero, coincident or nearly so with the start of the strobe preamble Pre. IC 810 then uses strobe edges to capture data symbols. Finally, control logic 830 re-asserts offset signal OffSet with the postamble to return voltage offset Voffset to the inactive level. Reference source 820 can control the slew rate of transitions of voltage Vref to optimize the speed with which system 800 can transition between active and inactive modes. In other embodiment reference source 820 can be located elsewhere, but may nevertheless be controlled by circuitry on IC 805. In still other embodiments an offset control circuit at the receive side of the strobe channel can control reference-voltage offset timing as noted above in connection with, e.g., FIG. 1.

Figure 10:
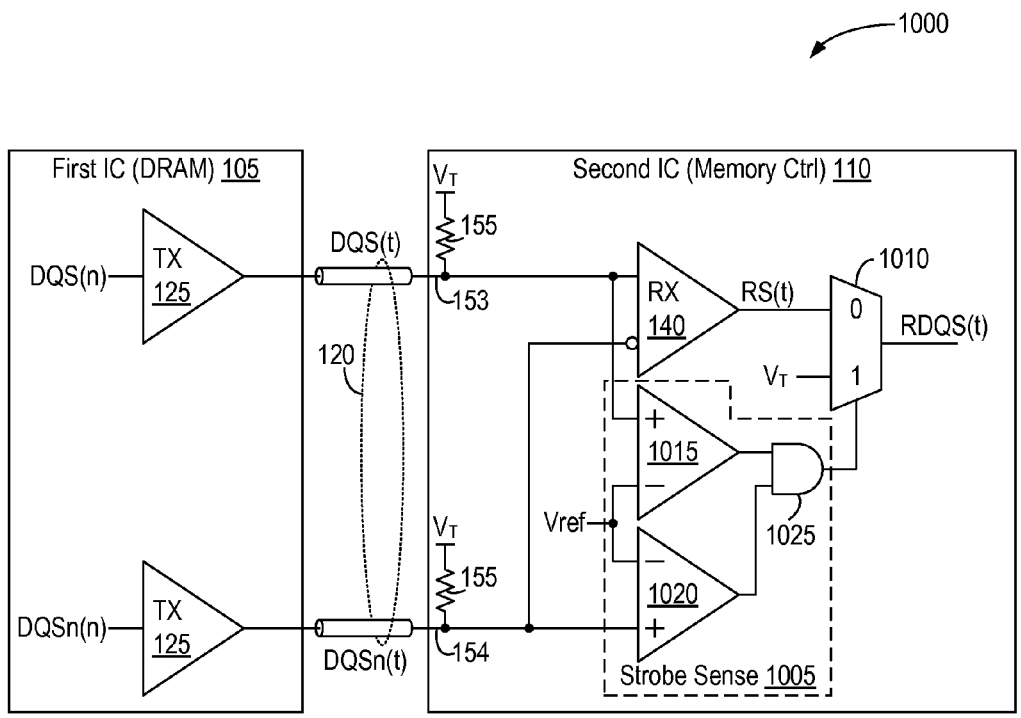
FIG. 10 depicts a communication system 1000 in accordance with another embodiment.

FIG. 10 depicts a communication system 1000 in accordance with another embodiment. System 1000 is in some ways similar to systems and circuits detailed previously, with like-identified elements being the same or similar. Rather than using hysteresis, however, the strobe receiver includes sense circuitry 1005 to distinguish between strobe preambles and noise. Sense circuitry 1005 controls a multiplexer 1010 to provide a recovered strobe signal RDQS(t) when a strobe is present on timing-reference nodes 153 and 154, and to provide a stable, relatively high voltage when the strobe is idle.

On the transmit side of a differential communication channel 120, an IC 105 conveys a differential, continuous-time strobe signal DQS(t)/DQSn(t). On the receive side, an amplifier 140 amplifies the difference between the differential strobe signals to produce a raw strobe signal RS(t). Two additional amplifiers 1015 and 1020 output voltages representative of a logic one if respective signal halves DQS(t) and DQSn(t) exceed a reference voltage Vref. An AND gate 1025 controls multiplexer 1020 responsive to the outputs from amplifiers 1015 and 1020 to produce recovered strobe signal RDQS(t).

Figure 11:
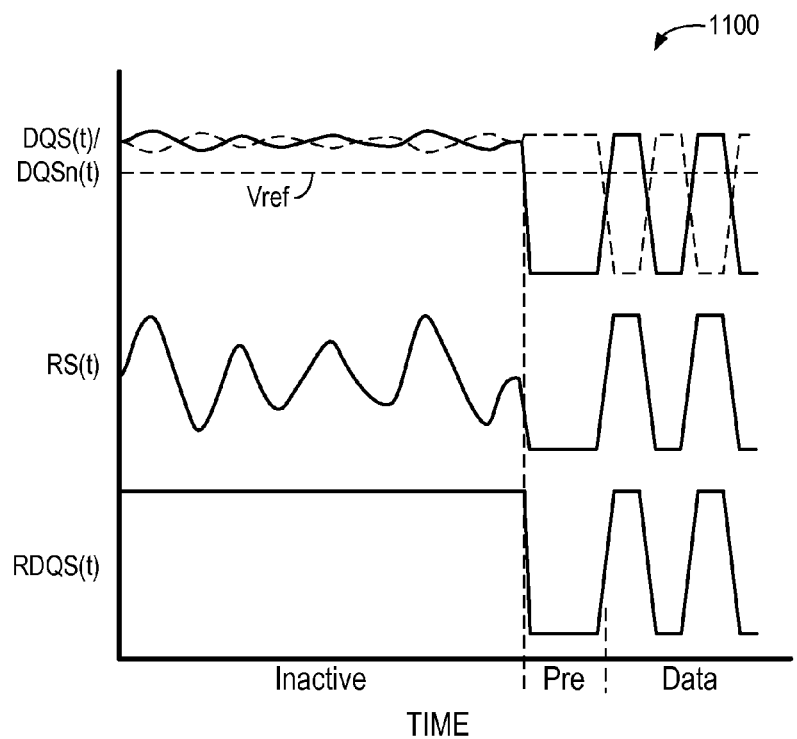
FIG. 11 depicts a waveform diagram 1100 that is used in connection with FIG. 10 to illustrate the operation of system 1000.

FIG. 11 depicts a waveform diagram 1100 that is used in connection with FIG. 10 to illustrate the operation of system 1000. Transmitters 125 enter a high-impedance state during an inactive period in which the strobe is idle. As a consequence, termination elements 155 pull nodes 153 and 154 high, toward termination voltage $V_T$. Reference voltage Vref is set below voltage $V_T$ by a margin sufficient to ensure that noise on signal halves DQS(t) and DQSn(t) does not cause either to dip below reference voltage Vref during the inactive period. The outputs of amplifiers 1015 and 1020 thus remain high while the strobe is idle. As a consequence, AND gate 1025 issues a logic one to the select terminal of multiplexer 1020, causing recovered strobe signal RDQS(t) to remain high (e.g., at voltage $V_T$ or some other suitable voltage level). Recovered strobe signal RDQS(t) is therefore stable during the inactive period despite the presence of noise on raw strobe signal RS(t). The strobe receiver thus exhibits a high sensitivity to the signals one nodes 153 and 154 while the strobe signal is active, and exhibits a relatively lower sensitivity when the strobe signal is inactive.

A transition of strobe signal half DQS(t)/DQSn(t) marks the beginning of the preamble period. One of the two signal halves, in this case DQS(t), goes below voltage Vref. The output of amplifier 1005 goes low, causing multiplexer 1020 to select raw strobe signal RS(t). Though not shown in FIG. 11, recovered strobe signal RDQs(t) returns to the steady high value (e.g., voltage $V_T$) when transmitters 125 return channel 120 to the high-impedance state.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines.

While the present invention has been described in connection with specific embodiments, after reading this disclosure variations of these embodiments will be apparent to those of ordinary skill in the art. For example, any signal that conveys timing information via transitions, and that has sufficient transition density to convey enough of the requisite timing information, can serve as a timing-reference signal. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A communication circuit comprising:
    a data node to convey a series of data symbols;
    a reference voltage node to convey a reference voltage;
    a timing-reference node to convey an intermittent timing-reference signal concomitant and synchronized with the data symbols;
    an amplifier coupled to the timing-reference node and the reference voltage node to perform a comparison between the intermittent timing-reference signal and the reference voltage, and to provide a recovered timing-reference signal responsive to the comparison;
    a sampler coupled to the data node and the amplifier, the sampler to sample the data symbols timed to the recovered timing-reference signal; and
    an offset control circuit to offset the comparison during a time in which the intermittent timing-reference signal is absent, the offset control circuit including a selectable impedance between the reference voltage node and a DC voltage node, wherein the offset control circuit selects the selectable impedance to offset the reference voltage.

2. The communication circuit of claim 1, wherein the offset control circuit is coupled to the amplifier to receive the recovered timing-reference signal, the offset control circuit to detect an absence of the recovered timing-reference signal.

3. The communication circuit of claim 1, wherein the amplifier and the offset control circuit are instantiated on an integrated circuit.

4. The communication circuit of claim 1, wherein the reference voltage is a second intermittent timing-reference signal, complementary to the first-mentioned intermittent timing-reference signal when the intermittent timing-reference signal is present.

5. The communication circuit of claim 4, wherein the second intermittent timing-reference signal comprises a strobe signal.

6. The communication circuit of claim 1, wherein the offset control circuit and the amplifier are instantiated on respective first and second integrated circuits.

7. The communication circuit of claim 6, wherein the first integrated circuit includes the selectable impedance between the reference voltage node and the DC voltage node, and wherein the offset control circuit selects the selectable impedance to offset the reference voltage.

8. The communication circuit of claim 1, further comprising a reference voltage source coupled to the reference voltage node to deliver the reference voltage, wherein the offset control circuit is coupled to the reference voltage source to initiate an offset of the reference voltage absent the intermittent timing-reference signal.

9. A method of recovering a timing-reference signal to sample a data signal, the method comprising:
    establishing a reference voltage against which to compare the timing-reference signal;
    absent the timing-reference signal, applying an offset to the reference voltage to obtain an offset reference voltage;
    sensing, with an amplifier, the timing-reference signal with reference to the offset reference voltage and, responsive to the sensing, removing the offset to restore the reference voltage;
    sensing, with the amplifier, the timing-reference signal with reference to the restored reference voltage; and
    sampling the data signal responsive to the sensed timing-reference signal.

10. The method of claim 9, wherein the timing-reference signal includes a preamble, and wherein sensing the timing-reference signal with reference to the offset reference voltage comprises comparing the preamble with the offset reference voltage.

11. The method of claim 9, wherein the timing-reference signal includes a postamble, the method further comprising sensing the postamble and, responsive to the sensed postamble, applying the offset to the reference voltage.

12. The method of claim 11, wherein applying the offset responsive to the sensed postamble includes reducing an impedance between an input node of the amplifier and a DC node.

13. The method of claim 12, wherein reducing the impedance comprises reducing the impedance by a first amount responsive to the sensed postamble and subsequently reducing the impedance by a second amount less than the first amount.

14. The method of claim 9, wherein the reference voltage is a second timing-reference signal complementary to the first-mentioned timing-reference signal.

15. The method of claim 9, wherein the timing-reference signal comprises a strobe signal.

16. A circuit for recovering a timing-reference signal, the circuit comprising:
    a reference voltage against which to compare the timing-reference signal;
    offset-control means for applying an offset to the reference voltage in an absence of the timing-reference signal, wherein the offset-control means for applying the offset applies the offset in stages to rapidly impose the offset; and
    amplifier means for sensing the timing-reference signal with reference to the offset reference voltage and, responsive to the sensing, removing the offset to restore the reference voltage;
    wherein the amplifier means for sensing senses the timing-reference signal with reference to the restored reference voltage.

17. The circuit of claim 16, further comprising sampling means for sampling a data signal timed to the timing-reference signal.

18. The circuit of claim 16, wherein the reference voltage comprises a second timing-reference signal, complementary to the first-mentioned timing-reference signal when the timing-reference signal is present.

19. A memory-controller integrated circuit (IC) comprising:
    a data node to transmit sequences of data symbols, separated by idle periods, to a memory IC;
    a timing-reference node to transmit an intermittent timing-reference signal to the memory IC, the timing-reference signal exhibiting signal transitions concomitant and synchronized with sequences of data symbols, and exhibiting a stable level during idle periods;
    a second reference node to transmit a second reference signal against which to compare the timing-reference signal; and
    an offset control circuit to increase a separation between the timing-reference signal and the second reference signal during the idle periods.

20. The integrated circuit of claim 19, wherein the second reference signal comprises a second intermittent timing-reference signal complementary to the first-mentioned intermittent timing-reference signal.

21. The integrated circuit of claim 19, the offset control circuit including a selectable impedance between a DC node and one of the timing-reference node and the second reference node.

22. The integrated circuit of claim 21, the offset control circuit including a second selectable impedance between a second DC node and the other one of the timing-reference node and the second reference node.

23. The integrated circuit of claim 21, the offset control circuit including a second selectable impedance between the DC node and the one of the timing-reference node and the second reference node.

24. The integrated circuit of claim 23, wherein the offset control circuit sequentially selects the first-mentioned and second selectable impedances to transition to the idle periods.

25. The integrated circuit of claim 19, the offset control circuit to increase the separation by changing an impedance between a DC node and one of the timing-reference node and the second reference node.

26. The integrated circuit of claim 25, wherein the offset control circuit changes the impedance over a range of impedances to transition to the idle periods.

27. The integrated circuit of claim 26, wherein the offset control circuit changes the impedance stepwise over the range.

28. The integrated circuit of claim 27, wherein the offset control circuit steps through two impedances to transition to the idle periods.

29. An integrated circuit comprising:

a data node to convey sequences of data symbols separated by idle periods;

a timing-reference node to convey an intermittent timing-reference signal exhibiting signal transitions concomitant and synchronized with the sequences of data symbols, and exhibiting a stable level during inactive periods;

a second reference node to convey a second reference signal against which to compare the timing-reference signal; and a strobe receiver coupled to the timing-reference node and the second reference node to amplify the timing-reference signal, the strobe receiver exhibiting a first sensitivity concomitant with the data symbols and a second, reduced, sensitivity during the inactive periods;

wherein the strobe receiver includes an offset control circuit to increase a separation between the timing-reference signal and the second reference signal during the idle periods.

30. The integrated circuit of claim 29, wherein the strobe receiver includes a strobe sensor coupled to at least one of the timing-reference and second reference nodes to sense the strobe.

31. The integrated circuit of claim 30, wherein the strobe receiver further includes an amplifier coupled to the timing-reference node to perform a comparison between the intermittent timing-reference signal and a reference voltage and provide a raw timing-reference signal responsive to the comparison.

32. The integrated circuit of claim 31, wherein the strobe sensor blocks the raw timing-reference signal during the idle periods.

* * * * *